C. WADSWORTH.
Curd Cutter.
No. 50,290. Patented Oct. 3, 1865.
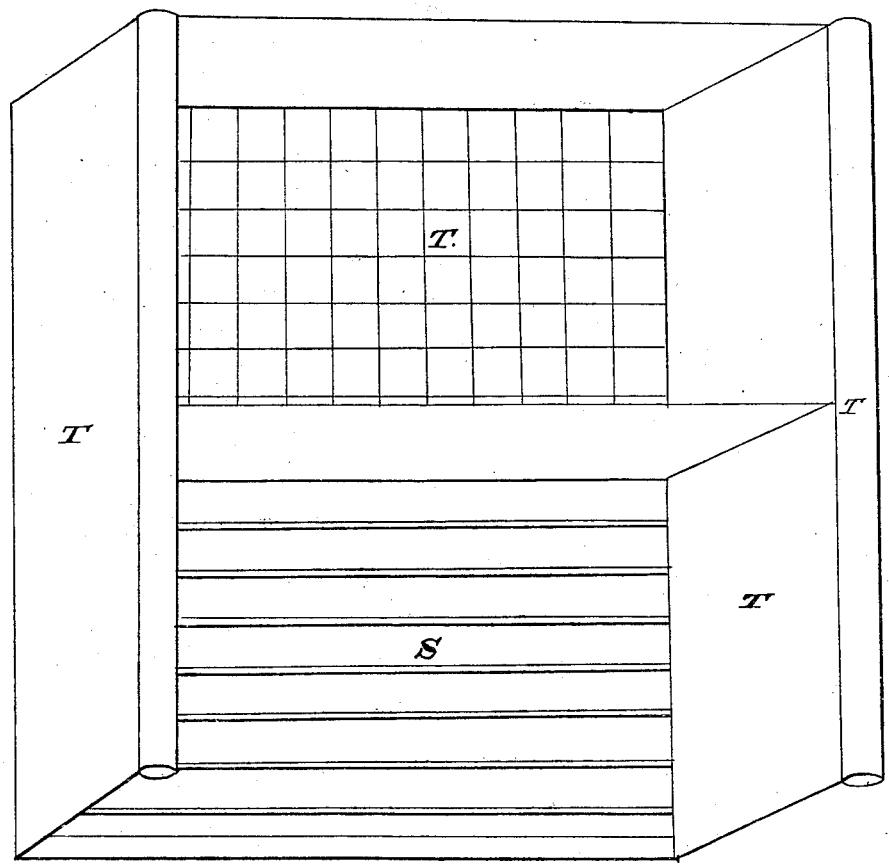
Witnesses.
D. W. Thompson
N. E. Whittemore
Inventor:
Christopher Wadsworth

UNITED STATES PATENT OFFICE.

CHRISTOPHER WADSWORTH, OF EAST LIVERMORE, MAINE.

IMPROVEMENT IN CURD-CUTTERS.

Specification forming part of Letters Patent No. 50,290, dated October 3, 1865.

*To all whom it may concern:*

Be it known that I, CHRISTOPHER WADSWORTH, of East Livermore, in the county of Androscoggin and State of Maine, have invented a new and useful Machine for Cutting Curd, (title: "C. Wadsworth's Curd-Cutter;" and I do hereby declare that the following is a full, clear, and exact description of the construction and operation of the same, reference being had to the annexed drawing, making part of this specification, in which—

Figure 1 is a perspective view. and of full size.

Letter T, and colored blue, represents sheet-tin, of which it is all composed, excepting eight steel slicers, (marked S and painted red,) the outer one being wide to strengthen it. Three sides are formed of tin. It is eight inches long, seven wide, and seven high, with wire running around the top and rolls or handles whole length of sides; also, a division between the squares and slicers. A person using it holds it by the rolls and presses the slicers upon the curd, beginning at one side of the curd, and laying aside the slices; then, turning the machine and pressing the squares on these slices, the curd is cut as fine as is necessary.

With this machine one person may cut the curd for a sixty-pound cheese in five minutes, which takes by the usual hand process over two hours. It has been proved to entire satisfaction in a dairy of forty cows for one year.

What I claim as my invention, and desire to secure by Letters Patent, is—

In a machine for cutting curd, as herein described, both the slicers and squares in combination.

CHRISTOPHER WADSWORTH.

Witnesses:
P. S. WHITTEMORE,
N. E. WHITTEMORE.